Oct. 27, 1970     A. FINEMAN     3,535,861
HIGHWAY POST TRIMMER

Filed July 15, 1968     2 Sheets-Sheet 1

INVENTOR.
ABRAHAM FINEMAN

BY *Lawrence I. Lerner*

ATTORNEY

Oct. 27, 1970      A. FINEMAN      3,535,861

HIGHWAY POST TRIMMER

Filed July 15, 1968      2 Sheets-Sheet 2

INVENTOR.
ABRAHAM FINEMAN

BY

ATTORNEY

United States Patent Office 3,535,861
Patented Oct. 27, 1970

3,535,861
HIGHWAY POST TRIMMER
Abraham Fineman, % Lawn Craft, Inc., 3 Calvert Ave. W., Edison, N.J. 08817
Filed July 15, 1968, Ser. No. 744,737
Int. Cl. A01d 35/26
U.S. Cl. 56—25.4                               4 Claims

ABSTRACT OF THE DISCLOSURE

A highway post trimmer for cutting grass 360° around a post comprising a mower attachment adapted to be attached to an arm extending from the side of a vehicle which attachment allows the vehicle to continue to move in a forward direction while cutting 360° around a post. The attachment has a front edge which aligns itself with the post and then is adapted to be rotated 180° to achieve 360° cutting. Two rotary motors are provided on opposite sides of the trimmer so that, initially, substantially, a 180° swatch of grass is cut and as the trimmer rotates around the post the other half of the grass is cut. The trimmer comprises a platform deck supported by two main fixed wheels and a third rotatable wheel. The axes of the main wheels converge at the assumed center of the post and the rotatable, or caster wheel supports the back of the trimmer in its travel around the post. Mounted on the platform are two rotary mowers each having its lower blade below the platform. The platform is carried on a boom extending horizontally from a transport vehicle. The front edge of the trimmer attachment has a concave surface which fits around the post. The boom also carries means for rotating the platform 180° from its starting position.

HISTORY OF THE INVENTION

Highway mowing is achieved by utilizing tractor drawn mowers which drive along the side of the highway cutting the grass. However, where there are posts along the highway it is normally necessary to have someone separately cut the grass around the post. Various attempts have been made to provide attachments for cutting the grass around the post so that only one operator need be provided for each tractor drawn mower. However, none of these attempts have proved practicable as the prior art attachments did not complete a 360° rotation around the post therefore leaving a sector of grass uncut.

Further, prior art devices have always involved substantially complicated mechanical apparatus which could not be operated from the power mower itself and which required that the power mower stop during the operation or be mowed back and forth until the trimming was completed.

SUMMARY OF THE INVENTION

The present invention contemplates the provision of a horizontal boom attachment for a standard tractor mower, or other vehicle, which boom attachment will have two gasoline powered rotary mowers mounted on a platform so as to cut a 180° swath through grass around a pole positioned within a concave surface of the forward edge of the platform. The platform is then rotated by controls on the vehicle 180° around the post without being interferred with by the post so that a full 360° cut is achieved around the post. The vehicle can continue in its forward direction and, prior to reaching the next post, the platform would have been returned to its original position so as to be ready for cutting around the next post.

For the purpose of illustrating the invention, there is shown in the drawings a form which is presently preferred; it being understood, however, that this invention is not limited to the precise arrangements and instrumentalities shown.

Figure 1:
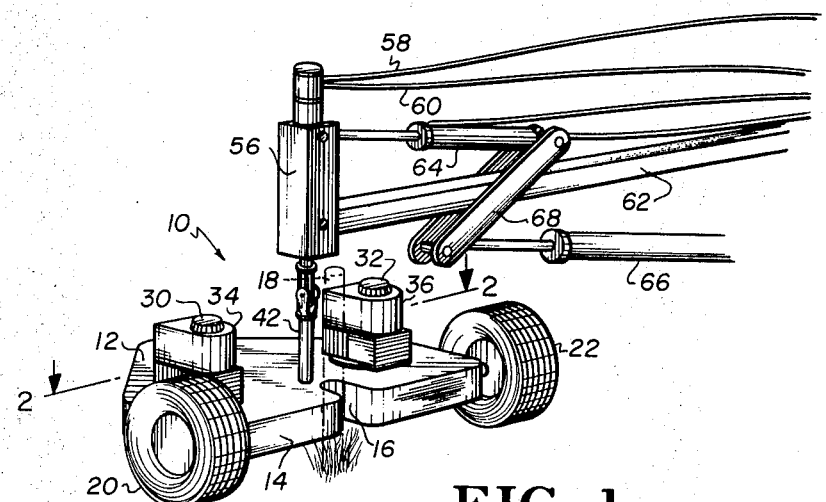
FIG. 1 is a perspective view of the highway post trimmer attachment of the present invention.
Figure 2:
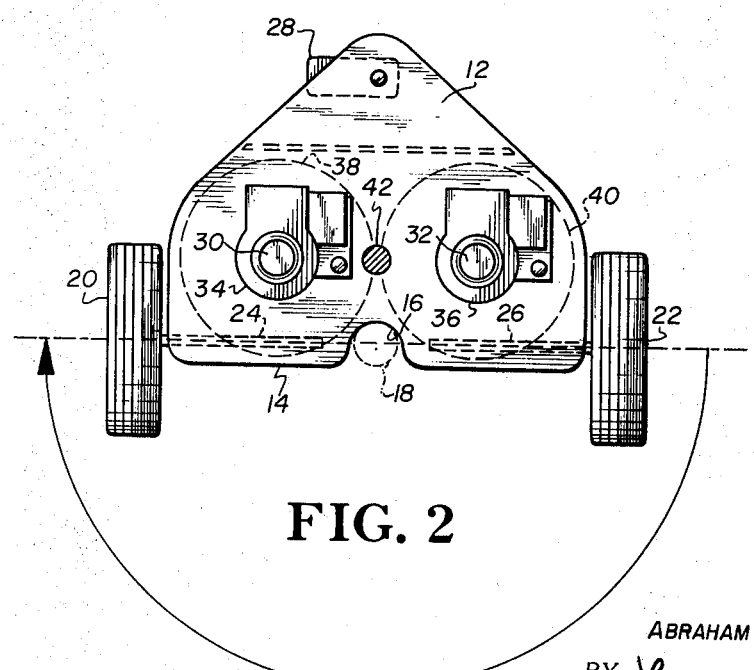
FIG. 2 is a top plan view of the attachment 1 taken along lines 2—2.
Figure 3:
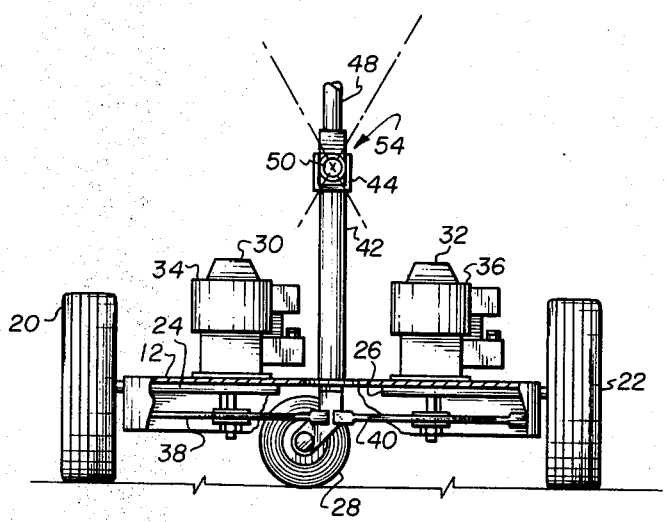
FIG. 3 is a front elevational view of the trimmer attachment of FIG. 2, partially broken away to show the mower blades.
Figure 4:
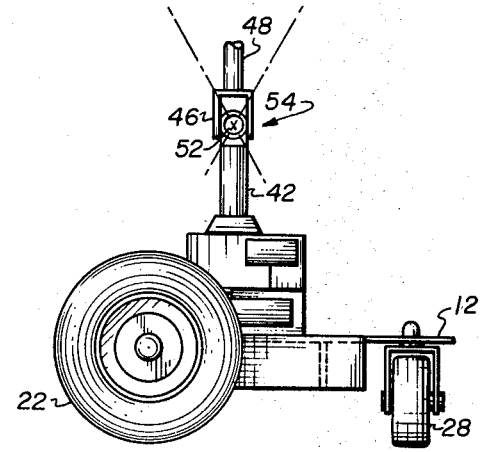
FIG. 4 is a left side elevational view of the trimmer attachment shown in FIG. 3.

In FIG. 1, there is shown the highway post trimmer attachment of the present invention generally designated by the numeral 10. The post trimmer attachment 10 includes a platform 12, substantially horizontal, having a front downwardly extending edge 14. The front edge 14 has a U-shaped concave surface 16 for receiving a post 18 as best shown in FIG. 2. Two fixed wheels 20 and 22 are mounted on opposite sides of the platform 12. The wheels 20 and 22 have their respective axles 24 and 26 coaxially aligned with each other and, additionally, aligned with the center of the concave surface 16 so that, when a post 18 is positioned within the surface 16, the assumed center of the post 18 will be in line with the axes of the axles 24 and 26. At the rear of the platform 12 is positioned a third rotatable wheel or caster wheel 28. The caster wheel 28 is mounted for free rotation with respect to the platform 12.

Mounted on the platform 12, on opposite sides of the concave surface 16 there are positioned two gasoline motor driven rotary mowers 30 and 32. The mowers 30 mounted on top of the platform 12. The motors 34 and 36 are standard gasoline mowers for driving rotary grass cutting blades 38 and 40 respectively. The blades 38 and 40 are positioned below the platform 12 and are substantially covered by the front edge 14 to prevent injury to persons who might be standing near the attachment 10. The blades 38 are positioned, as shown in FIG. 2, to cut as close to each other as possible and as close to the front edge 14 and concave surface 16 as possible without interfering with the operation of the platform 12 or the other blade. Thus, there is substantially 180° cutting around a post 18 when the post 18 is positioned within the concave surface 16.

A drive member 42 is positioned at the cross over point between the axes of the mowers 30 and 32 and the axis of the concave surface 16 and caster wheel 28. The drive member 42 is vertically positioned and, at its top, has a bifurcation 44 which fits within a bifurcation 46 on a rotary drive rod 48. The bifurcations 44 and 46 are joined by members 50 and 52 to form a knuckle joint 54. The drive rod 48 is connected to a rotary hydraulic drive member 56. Rotary drive member 56 is controlled by two hydraulic lines 58 and 60 connected to an hydraulic source on the vehicle (not shown) which supports the attachment 10. Hydraulic pressure through the lines 58 and 60 will cause the hydraulic rotary drive member 56 to rotate the drive member 48 and 42 to give horizontal rotation to the platform 12. Hydraulic rotary drive member 56 is mounted on a suitable boom 62. The boom 62 carries a pair of piston and cylinder assemblies 64 and 66 controlled from the carrying vehicle and connected through a linking 68 to effect relative movement of the attachment 10.

The entire boom assembly moves in toward the vehicle forward, and outward again as the platform and mowers rotate about the post. Provision for this translocation is made by having the hydraulic fluid in cylinders 64 and 66 bypass the control valves during the period of rotation.

In operation, the operator in the tractor mower or transport vehicle approaches the post 18 with the attachment 10 suspended in the air at the end of the boom 62. As he nears the post 18, he slows the transport vehicle to a crawl and gradually lowers the trimmer to ground level and fits the concave surface 16 around the post 18. At this point, he lowers the boom until the wheels 20, 22 and 28 touch the ground. The machine is propelled around the post by means of the rotary hydraulic member 56 supplied with hydraulic fluid from the lines 58 and 60 and controlled by the driver on the transport vehicle. It should be understood that other means of rotating the platform 12 could be utilized within the teaching of the present invention such as by utilizing a chain drive or the like. The main wheels 20 and 22 whose axes are aligned with the center of the post 18 travel in a circular pattern around the post as best shown in FIG. 2. The caster wheel also moves in a substantially circular path around the post.

After completing 180° rotation, the caster wheels have been moved to the side of the machine facing forward down the highway and the front surface 14 and its associate concave surface 16 are now, effectively, the back surface as they are facing back down the highway. The operator then moves his transport vehicle forward which cuts the grass strip left by the tractor mower. This usually extends 4 to 6 feet on each side of the post parallel with the roadway. Then the operator raises the machine off the ground. During the travel from one place to the next, while the trimmer is suspended in the air, the operator returns the trimmer 180° back to its original position by merely reversing the hydraulic pressure supplied through the lines 58 and 60.

It will further be understood that other types of mowers and mower blade drives can be utilized in accordance with the teachings of the present invention. For example, the gasoline motor driven rotary motors can be substituted for with rotary motors driven from a common source on the tractor itself, which common source might also be a means for supplying power to drive the drive member 42 to thus effect 180° rotation of the platform 12.

The present invention may be embodied in other specific forms without departing from the spirit or essential attributes thereof, and accordingly, reference should be made to the appended claims rather than to the foregoing specification as indicating the scope of the invention.

I claim as my invention:

1. A grass cutting attachment for cuting grass around a post comprising a horizontal platform having a front edge, a concave surface formed in the central portion of said front edge and adapted to conform to the shape of a post, a pair of coaxial wheels mounted on opposite sides of said platform with their common axes passing through said concave surface, a pair of rotary grass cutting blades mounted below said platform spaced from one another with each having a portion of their path of travel substantially co-extensive with said front edge and said concave surface on opposite sides of said concave surface, drive means for driving said rotary grass cutting blades, rotary power means for rotating said platform in a horizontal plane about a post positioned abutting said concave surface, means for operatively positioning said horizontal platform to abut a post within and against said concave surface, said horizontal platform having a rotary drive member extending vertically upward therefrom, said rotary drive member being positioned at a point substantially midway between the axes of said rotary grass cutting blades, said rotary power means including a rotary hydraulic member connected to said rotary drive member, said rotary hydraulic member being operative to impart 180° rotation to said horizontal platform through said rotary drive member, said rotary hydraulic member being operative to be controlled from a point spaced from said hydraulic platform.

2. The grass cutting attachment for cutting grass around a post of claim 1 wherein said means for operatively positioning said horizontal platform includes means for lifting said horizontal platform.

3. The grass cutting attachment for cutting grass around a post of claim 2 including a caster wheel, said caster wheel being positioned below said horizontal platform on the opposite side of said rotary drive member from said concave surface, said caster wheel being mounted to said horizontal platform at a point in line with said rotary drive member and said concave surface.

4. The grass cutting attachment for cutting grass around a post of claim 1 wherein said drive means for driving said rotary grass cutting blades includes two gasoline motors mounted on said horizontal platform.

References Cited

UNITED STATES PATENTS

| 2,838,901 | 6/1958 | Davis | 56—25.4 |
| 3,152,431 | 10/1964 | Ott et al. | 56—25.4 |
| 3,241,302 | 3/1966 | Barry | 56—25.4 |

LOUIS G. MANCENE, Primary Examiner

J. N. ESKOVITZ, Assistant Examiner

U.S. Cl. X.R.

56—6